(12) United States Patent
Matsuura et al.

(10) Patent No.: US 12,337,642 B2
(45) Date of Patent: Jun. 24, 2025

(54) SUSPENSION CONTROL APPARATUS AND METHOD FOR CONTROLLING A SUSPENSION CONTROL APPARATUS

(71) Applicant: Hitachi Astemo, Ltd., Hitachinaka (JP)

(72) Inventors: Makoto Matsuura, Hitachinaka (JP); Ryusuke Hirao, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 241 days.

(21) Appl. No.: 18/017,232

(22) PCT Filed: Jul. 21, 2021

(86) PCT No.: PCT/JP2021/027299
§ 371 (c)(1),
(2) Date: Jan. 20, 2023

(87) PCT Pub. No.: WO2022/024919
PCT Pub. Date: Feb. 3, 2022

(65) Prior Publication Data
US 2023/0294474 A1 Sep. 21, 2023

(30) Foreign Application Priority Data
Jul. 31, 2020 (JP) ................... 2020-130306

(51) Int. Cl.
*B60G 17/018* (2006.01)

(52) U.S. Cl.
CPC .... *B60G 17/018* (2013.01); *B60G 2400/0511* (2013.01); *B60G 2400/0512* (2013.01);
(Continued)

(58) Field of Classification Search
CPC .......... B60G 17/018; B60G 2400/0511; B60G 2400/0512; B60G 2400/102;
(Continued)

(56) References Cited

U.S. PATENT DOCUMENTS

2014/0095024 A1   4/2014   Hirao

FOREIGN PATENT DOCUMENTS

| JP | H0732839 A | * | 2/1995 |
| JP | 2014-69759 |   | 4/2014 |
| KR | 100324436 B1 | * | 7/2000 |

OTHER PUBLICATIONS

"Deep Learning", Wikipedia, accessed Nov. 22, 2024. (Year: 2024).*
(Continued)

*Primary Examiner* — Mark L. Greene
(74) *Attorney, Agent, or Firm* — Wenderoth, Lind & Ponack, L.L.P.

(57) ABSTRACT

A controller controls a suspension apparatus including a variable damper that adjusts a force between a vehicle body and a wheel of a vehicle. The controller includes a first instruction calculation portion and a control instruction output portion. The first instruction calculation portion outputs a first instruction value of a damping force, which corresponds to a first target amount, using a learning result acquired from machine learning in advance by inputting a plurality of different pieces of information. The control instruction output portion limits the first instruction value and outputs it as a control instruction in a case where the first instruction value works in a direction leading to a greater vehicle state amount than a predetermined amount due to control of the variable damper based on the first instruction value.

15 Claims, 5 Drawing Sheets

(52) U.S. Cl.
CPC .. *B60G 2400/102* (2013.01); *B60G 2400/821* (2013.01); *B60G 2600/04* (2013.01); *B60G 2600/044* (2013.01); *B60G 2600/08* (2013.01); *B60G 2600/1878* (2013.01); *B60Y 2400/86* (2013.01)

(58) Field of Classification Search
CPC .......... B60G 2400/821; B60G 2600/04; B60G 2600/044; B60G 2600/08; B60G 2600/1878; B60Y 2400/86
See application file for complete search history.

(56) References Cited

OTHER PUBLICATIONS

Takehara, S, JP H07-32839, Feb. 3, 1995, machine translation (Year: 1995).*
International Search Report issued Sep. 28, 2021 in corresponding International Application No. PCT/JP2021/027299, with English translation.
Written Opinion of the International Searching Authority issued Sep. 28, 2021 in corresponding International Application No. PCT/JP2021/027299, with English translation.

* cited by examiner

SUSPENSION CONTROL APPARATUS AND METHOD FOR CONTROLLING A SUSPENSION CONTROL APPARATUS

TECHNICAL FIELD

The present disclosure relates to a suspension control apparatus and a method for controlling a suspension control apparatus.

BACKGROUND ART

Conventional suspension control detects or estimates a vehicle state and performs feedback control according thereto (refer to PTL 1). For example, the skyhook control law or BLQ (Bi-linear Optimal Control) is used for the feedback control.

CITATION LIST

Patent Literature

PTL 1: Japanese Patent Application Public Disclosure No. 2014-69759

SUMMARY OF INVENTION

Technical Problem

Now, control such as the skyhook control law or BLQ is used in a suspension control apparatus disclosed in PTL 1. However, these control methods are control based on a linear or bilinear system, and therefore are not necessarily optimal control.

On the other hand, one conceivable method effective to improve the control accuracy is control using machine learning, like causing a system to learn an instruction of direct optimal control and a vehicle state in advance and calculate an instruction using only a weight coefficient acquired as a learning result. However, in the control using machine learning, a process of deriving the control instruction is unclear, and therefore a method for verifying that the learning result is correct may be unavailable. For this reason, if an abnormal result is yielded from the calculation of the instruction using the learning result due to occurrence of, for example, a learning error or a random failure in an ECU (an electronic control unit), the vehicle state may become unstable.

An object of one aspect of the present invention is to provide a suspension control apparatus and a method for controlling a suspension control apparatus capable of verifying a result of calculating a control instruction.

Solution to Problem

According to one aspect of the present invention, a suspension control apparatus is configured to control a suspension apparatus including a force generation mechanism configured to adjust a force between a vehicle body and a wheel of a vehicle. The suspension control apparatus includes a first instruction calculation portion configured to output a first target amount using a learning result acquired from machine learning in advance by inputting a plurality of different pieces of information, and a control instruction output portion configured to output a control instruction for controlling the force generation mechanism based on the first target amount. The control instruction output portion is configured to limit the first target amount and output it as the control instruction in a case where the first target amount works in a direction leading to a greater vehicle state amount than a predetermined amount due to the control of the force generation mechanism based on the first target amount.

One aspect of the present invention is a method for controlling a suspension apparatus including a force generation mechanism configured to adjust a force between a vehicle body and a wheel of a vehicle. The method includes a first step of outputting a first target amount using a learning result acquired from machine learning in advance by inputting a plurality of different pieces of information, and a second step of limiting the first target amount and outputting it as a control instruction to the force generation mechanism in a case where the first target amount works in a direction leading to a greater vehicle state amount than a predetermined amount due to control of the force generation mechanism based on the first target amount.

Advantageous Effects of Invention

According to the one aspect of the present invention, the result of calculating the control instruction can be verified.

DESCRIPTION OF EMBODIMENTS

In the following description, a suspension control apparatus and a method for controlling a suspension control apparatus according to embodiments of the present invention will be described in detail with reference to the accompanying drawings, citing an example in which they are applied to a four-wheeled automobile. Each of steps in flowcharts illustrated in FIGS. 4 and 5 will be represented by the symbol "S" (for example, assume that "S1" represents step 1).

Figure 1:
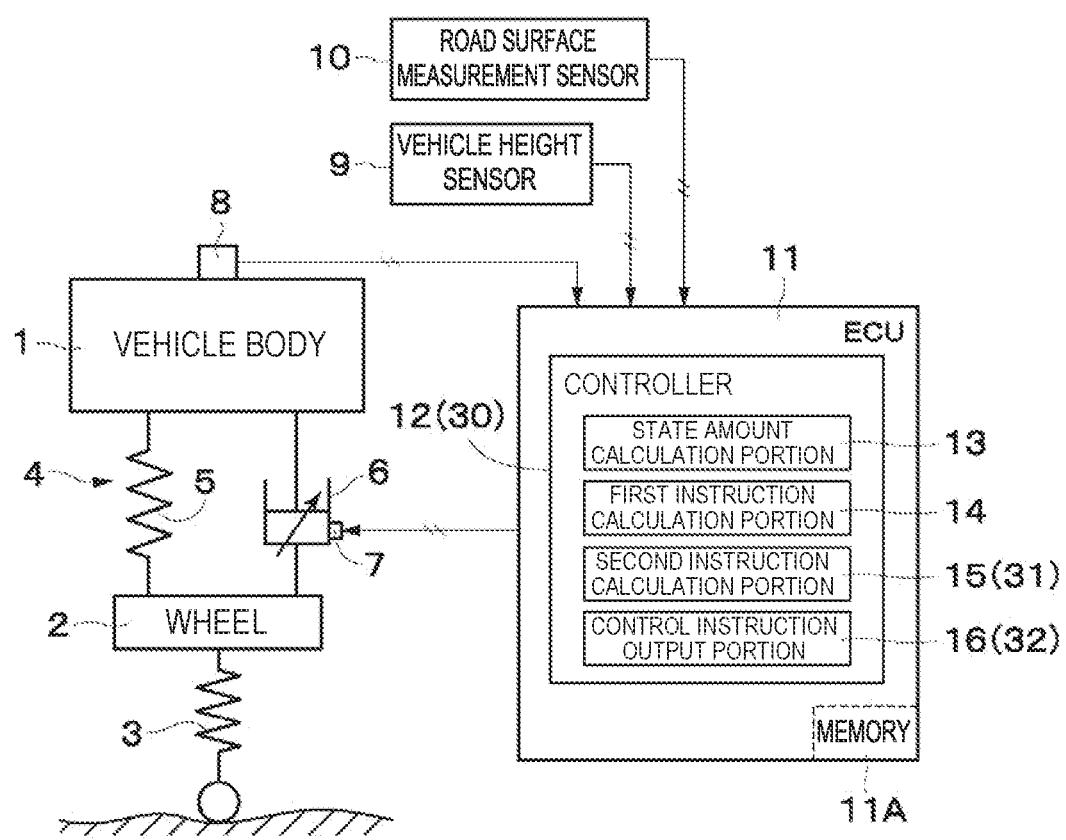
FIG. 1 schematically illustrates a suspension control apparatus according to first and second embodiments.

FIGS. 1 to 4 illustrate a first embodiment. In FIG. 1, for example, left and right front wheels and left and right rear wheels (hereinafter collectively referred to as wheels 2) are mounted under a vehicle body 1, which constitutes a main structure of a vehicle. These wheels 2 each include a tire 3. The tire 3 functions as a spring that absorbs fine roughness of a road surface.

A suspension apparatus 4 is provided so as to be interposed between the vehicle body 1 and the wheel 2. The suspension apparatus 4 includes a suspension spring 5 (hereinafter referred to as a spring 5), and a damping force adjustable shock absorber (hereinafter referred to as a variable damper 6), which is provided so as to be arranged in a parallel relationship with the spring 5 and interposed between the vehicle body 1 and the wheel 2. FIG. 1 schematically illustrates a configuration in a case where one set of suspension apparatus 4 is provided between the vehicle body 1 and the wheel 2. In the case of the four-wheeled automobile, the suspension apparatus 4 is mounted in such a manner that four sets in total are provided individually independently between the four wheels 2 and the vehicle body 1.

Then, the variable damper 6 of the suspension apparatus 4 is a force generation mechanism that generates an adjustable force between the vehicle body 1 side and the wheel 2 side. The variable damper 6 is formed using a damping force adjustable hydraulic shock absorber. The damper 6 is equipped with a damping force variable actuator 7 formed by a damping force adjustment valve or the like for adjusting the characteristic of a generated damping force (i.e., a damping force characteristic) continuously from a hard characteristic (a high characteristic) to a soft characteristic (a low characteristic). The damping force variable actuator 7 does not necessarily have to be configured to continuously adjust the damping force characteristic, and may be configured to be able to adjust the damping force through, for example, a plurality of steps equal to or more than two steps. Further, the variable damper 6 may be a pressure control-type damper or may be a flow rate control-type damper.

A sprung acceleration sensor 8 detects a vertical acceleration of the vehicle body 1 (a sprung side). The sprung acceleration sensor 8 is provided at any position of the vehicle body 1. The sprung acceleration sensor 8 is mounted on the vehicle body 1 at, for example, a position near the variable absorber 6. The sprung acceleration sensor 8 detects a vertical vibration acceleration on the vehicle body 1 side corresponding to the so-called sprung side, and outputs a detection signal thereof to an electronic control unit 11 (hereinafter referred to as an ECU 11).

A vehicle height sensor 9 detects a height of the vehicle body 1. As the vehicle height sensor 9, a plurality of (for example, four) vehicle height sensors is provided on, for example, the vehicle body 1 side located on the sprung side in correspondence with the wheels 2, respectively. In other words, each of the vehicle height sensors 9 detects a position of the vehicle body 1 relative to each of the wheels 2 (a height position) and outputs a detection signal thereof to the ECU 11.

A road surface measurement sensor 10 constitutes a road surface profile acquisition portion that detects a road surface profile as road surface information. The road surface measurement sensor 10 is formed by, for example, a plurality of millimeter-wave radars. The road surface measurement sensor 10 measures and detects a state of a road surface lying ahead of the vehicle (more specifically, including a distance and an angle to a road surface targeted for detection, and a screen position and a distance). The road surface measurement sensor 10 outputs the road surface profile based on a detection value of the road surface.

The road surface measurement sensor 10 may be, for example, a combination of a millimeter-wave radar and a monocular camera, or may be formed by a stereo camera including a pair of left and right image sensors (for example, digital cameras) as discussed in, for example, Japanese Patent Application Public Disclosure No. 2011-138244. The road surface measurement sensor 10 may be formed by an ultrasonic distance sensor or the like.

The ECU 11 is mounted on the vehicle body 1 side of the vehicle as a control apparatus in charge of behavior control including, for example, posture control of the vehicle.

The ECU 11 is formed using, for example, a microcomputer. The ECU 11 includes a memory 11A capable of storing data therein. The ECU 11 includes a controller 12.

The memory 11A stores therein, for example, a program of control instruction limit processing, which will be described below.

The input side of the ECU 11 is connected to the sprung acceleration sensor 8, the vehicle height sensor 9, and the road surface measurement sensor 10. The output side of the ECU 11 is connected to the damping force variable actuator 7 of the variable damper 6. The ECU 11 acquires the profile of the road surface and the vehicle state amount based on the detection value of the vertical vibration acceleration detected by the sprung acceleration sensor 8, the detection value of the vehicle height detected by the vehicle height sensor 9, and the detection value of the road surface detected by the road surface measurement sensor 10. The controller 12 calculates a force that should be generated by the variable damper 6 (the force generation mechanism) of the suspension apparatus 4 based on the profile of the road surface and the vehicle state amount. The controller 12 calculates a command signal (a control instruction) based on the force that should be generated by the variable damper 6, and outputs this command signal to the damping force variable actuator 7 of the suspension apparatus 4.

The ECU 11 stores the vehicle state amount, the road surface input, and data into the memory 11A over, for example, several seconds during which the vehicle runs by approximately 10 to 20 m. By this operation, the ECU 11 generates time-series data of the road surface input (the road surface profile) and time-series data of the vehicle state amount when the vehicle runs by a predetermined running distance.

Figure 2:
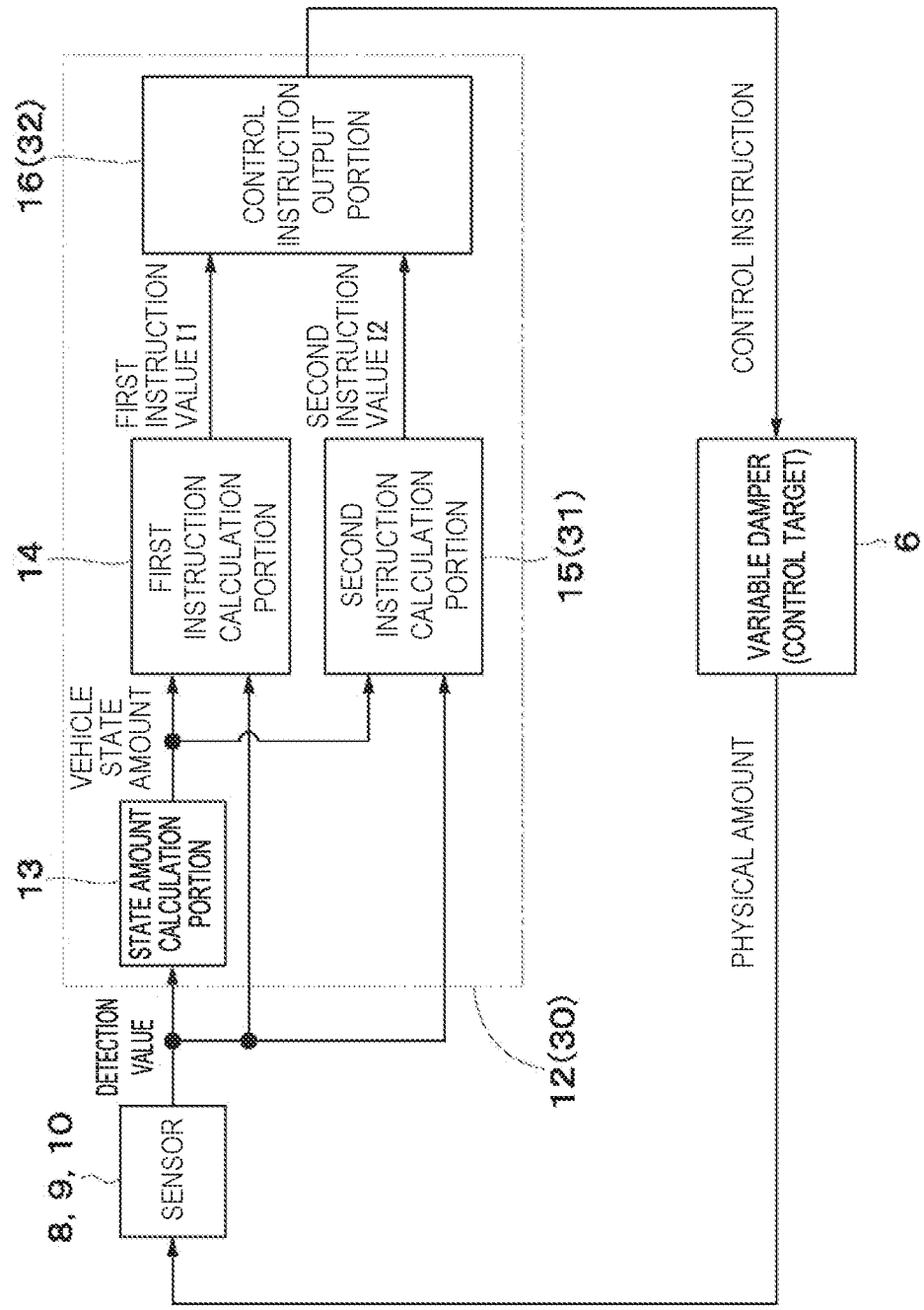
FIG. 2 is a block diagram illustrating a controller in FIG. 1.

As illustrated in FIG. 2, the controller 12 of the ECU 11 includes a state amount calculation portion 13, a first instruction calculation portion 14, a second instruction calculation portion 15, and a control instruction output portion 16.

The state amount calculation portion 13 determines the vehicle state amount based on the detection value of the vertical vibration acceleration detected by the sprung acceleration sensor 8 and the detection value of the vehicle height detected by the vehicle height sensor 9. The vehicle state amount includes, for example, the vertical vibration acceleration (a vertical vibration amount), the vehicle height, a sprung speed, a relative speed (a piston speed), a lateral acceleration, a roll amount, a pitch amount, and the like of the vehicle body 1.

The first instruction calculation portion 14 outputs a first instruction value of the damping force, which corresponds to a first target amount, using a learning result acquired from machine learning in advance by inputting a plurality of different pieces of information. The learning result is a deep neural network (DNN) already trained by deep learning. In other words, the first instruction calculation portion 14 is formed by the DNN. The first instruction calculation portion 14 is an AI instruction calculation portion, and is formed by, for example, a multi-layered neural network including four or more layers. Each layer includes a plurality of neurons, and neurons of two layers adjacent to each other are connected via a weight coefficient. The weight coefficient is set by the learning conducted in advance. The first target amount is, for example, a target damping force determined by the DNN. More specifically, the first instruction calculation portion 14 acquires the time-series data of the road surface input (the road surface profile) and the time-series data of the vehicle state amount based on the detection value of the vertical vibration acceleration detected by the sprung acceleration sensor 8, the detection value of the vehicle height detected by the vehicle height sensor 9, and the detection value of the road surface detected by the road surface measurement sensor 10. The first instruction calculation portion 14 outputs time-series data of an optimal instruction value based on the time-series data of the road surface input and the time-series data of the vehicle state amount. At this time, the latest optimal instruction value corresponds to the first instruction value of the damping force optimal at the present moment. Due to this operation, the first instruction calculation portion 14 outputs the first instruction value of the damping force most appropriate for the present vehicle and road surface. The first instruction value of the damping force corresponds to, for example, an electric current value for driving the damping force variable actuator 7.

The time-series data of the vehicle state amount is not limited to the time-series data of the vertical vibration acceleration and the vehicle height of the vehicle body 1, and may include time-series data of the sprung speed, the relative speed (the piston speed), the longitudinal acceleration, the lateral acceleration, the roll amount, the pitch amount, and/or the like.

The second instruction calculation portion 15 is, for example, a ride comfort control portion, and outputs a ride comfort control instruction for improving ride comfort on the vehicle. The second instruction calculation portion 15 has a control law not using machine learning, and outputs a second instruction value of the damping force, which corresponds to a second target amount, by inputting the vehicle state amount. The second target amount is, for example, a target damping force determined by the ride comfort control portion. The second instruction calculation portion 15 acquires the sprung speed and the relative speed between the sprung side and unsprung side (the piston speed) from the state amount calculation portion 13. The second instruction calculation portion 15 outputs the ride comfort control instruction based on the sprung speed and the relative speed of each of the wheels. At this time, the ride comfort control instruction is output in the form of, for example, a control instruction value serving as an instruction signal of the electric current supplied to the damping force variable actuator 7. The second instruction calculation portion 15 outputs the control instruction value for damping the sprung vertical vibration from the sprung speed and the relative speed based on, for example, the skyhook control law.

The second instruction calculation portion 15 is assumed to output the ride comfort control instruction based on the skyhook control in the first embodiment. The present invention is not limited thereto, and the ride comfort control portion may output the ride comfort control instruction based on, for example, the bilinear optimal control (the BLQ control) or the H ∞ control.

In the first embodiment, the second instruction calculation portion 15 outputs the ride comfort control instruction. Without being limited thereto, the second instruction calculation portion 15 may output, for example, a steering stability control instruction for improving the steering stability of the vehicle. In this case, the second instruction calculation portion 15 outputs a steering stability control instruction for suppressing roll, dive, squat, or the like of the vehicle based on, for example, the longitudinal acceleration, the lateral acceleration, the roll amount, the pitch amount, and/or the vertical vibration amount included in the vehicle state amount. Further, the second instruction calculation portion 15 may output a control instruction into which the ride comfort control instruction and the steering stability control instruction are integrated by prioritizing, for example, a hard-side control instruction of the ride comfort control instruction and the steering stability control instruction.

The control instruction output portion 16 is an instruction limit portion, and determines whether the first instruction value does not constitute an instruction failing to comply with the intention of the control, and imposes a limit on the first instruction value as necessary. The control instruction output portion 16 outputs the control instruction for controlling the variable damper 6 (the force generation mechanism) based on the first instruction value (the first target amount). If the first instruction value works in a direction leading to a vehicle state amount greater than a predetermined amount due to the control of the variable damper 6 based on the first instruction value, the control instruction output portion 16 limits the first instruction value and outputs it as the control instruction. The control instruction corresponds to an electric current value for driving the damping force variable actuator 7.

If the deviation of the first instruction value from the second instruction value is greater than a predetermined amount, the control instruction output portion 16 outputs a value within the predetermined amount from the second instruction value as the control instruction. The predetermined amount corresponds to an allowable range for the difference between the first instruction value and the second instruction value, and is set as appropriate based on, for example, a result of an experiment. If the deviation of the first instruction value from the second instruction value is greater than the predetermined amount, the control instruction output portion 16 limits the first instruction value and outputs it as the control instruction. If the deviation of the first instruction value from the second instruction value is smaller than the predetermined amount, the control instruction output portion 16 outputs the first instruction value as the control instruction.

Figure 3:
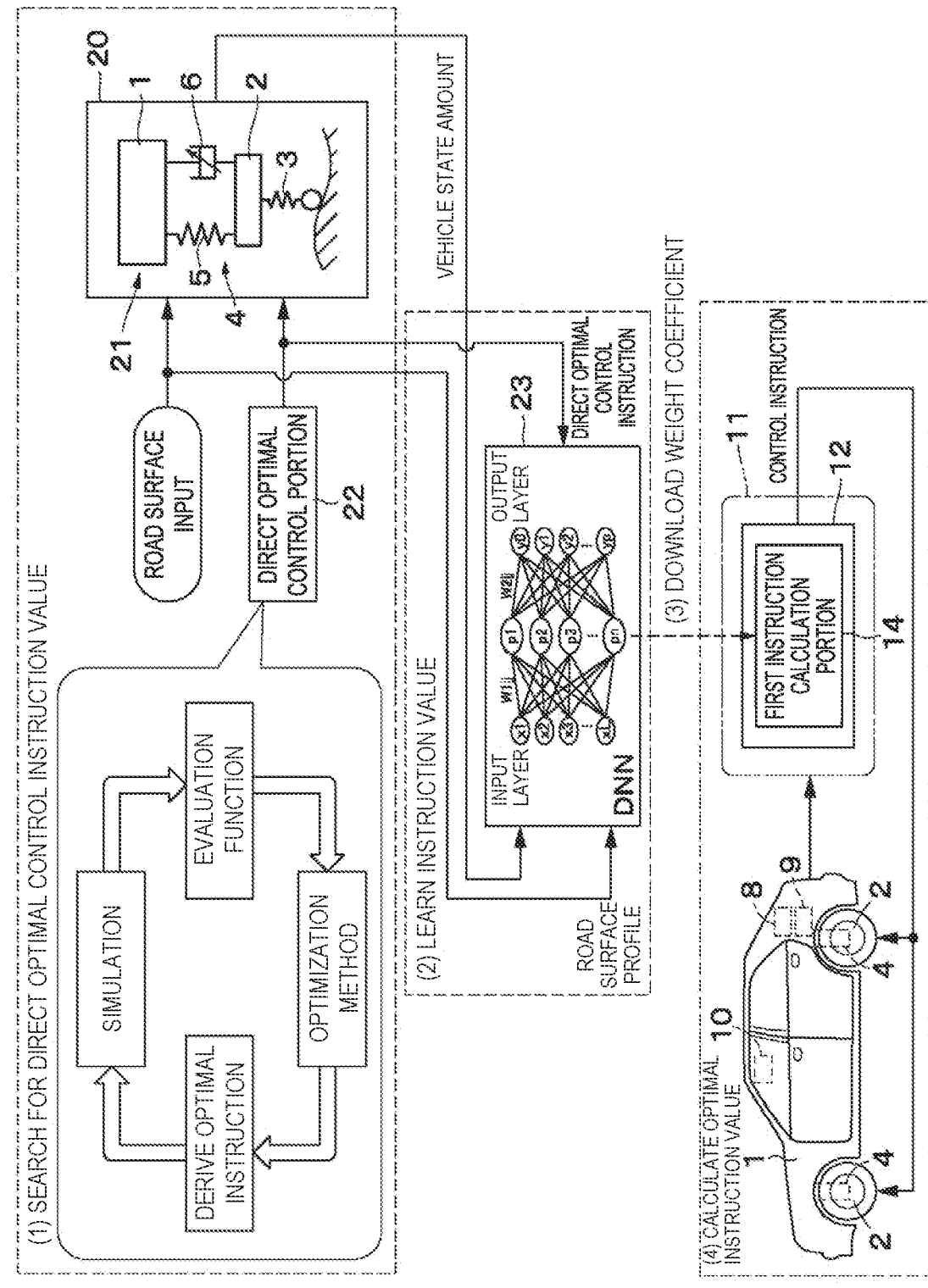
FIG. 3 illustrates a procedure of training a DNN in a first instruction calculation portion in FIG. 2.

Next, the learning method of the first instruction calculation portion 14 of the controller 12 will be described with reference to the illustrative diagram illustrated in FIG. 3. The first instruction calculation portion 14 is constructed by performing processing of (1) searching for a direct optimal control instruction value, (2) learning the instruction value, and (3) downloading a weight coefficient.

First, an analytical model 20 including a vehicle model 21 is constructed to search for the direct optimal control instruction value. FIG. 3 illustrates an example in a case where the vehicle model 21 is a one-wheel model. The vehicle model 21 may be, for example, a model of a pair of left and right two wheels. The road surface input is input and the optimal instruction value is input from a direct optimal control portion 22 to the vehicle model 21. The direct optimal control portion 22 calculates the optimal instruction value according to the following procedure for searching for the direct optimal control instruction value.

(1) Search for Direct Optimal Control Instruction Value

The direct optimal control portion 22 searches for the optimal instruction value by an iterative calculation using the analytical model 20 including the vehicle model 21 in advance. The search for the optimal instruction value is formulated as the following optimal control problem, and the optimal instruction value is calculated numerically analytically using the optimization method.

Assume that the motion of the targeted vehicle is expressed by an equation 1 in the form of an equation of state. Then, a dot in the equation represents a first-order differential with respect to time t (d/dt).

$$\dot{x}(t)=f\{x(t),u(t)\} \qquad \text{[Equation 1]}$$

In the equation 1, x and u represent the state amount and the control input, respectively. The initial condition of the equation of state is provided as indicated by an equation 2.

$$x(t_0)=x_0 \qquad \text{[Equation 2]}$$

A constraint equation and a constraint inequality imposed from an initial time t0 to a final time tf are expressed as indicated by an equation 3 and an equation 4, respectively.

$$\psi=\psi\{x(t),u(t)\}=0 \qquad \text{[Equation 3]}$$

$$\theta=\theta\{x(t),u(t)\}\le 0 \qquad \text{[Equation 4]}$$

The optimal control problem is a problem for seeking a control input u(t) so as to minimize an evaluation function J expressed as an equation 5 while satisfying the equation of state expressed as the equation 1, the initial condition expressed as the equation 2, and the constraints expressed as the equation 3 and the equation 4.

$$J=\int_{t_0}^{t_f}\phi\{x(t),u(t)\}dt \qquad \text{[Equation 5]}$$

It is extremely difficult to solve the optimal control problem subjected to the constraints formulated in the above-described manner. Therefore, the direct method capable of simply handling the constraints is used as the optimization method. This method is a method that converts the optimal control problem into a parameter optimization problem and acquires a solution using the optimization method.

The period from the initial time t0 to the final time tf is divided into N sections to convert the optimal control problem into the parameter optimization problem. Assuming that t1, t2, . . . , and tN represent the respective final times of the sections, the relationship among them is expressed as indicated by an equation 6.

$$t_0<t_1<t_2<\ldots<t_{X-1}<t_X=t_f \qquad \text{[Equation 6]}$$

Continuous inputs u(t) can be replaced with discrete values ui at the respective final times of the sections as indicated by an equation 7.

$$u_i=u(t_i),\ (i=0,1,\ldots,N) \qquad \text{[Equation 7]}$$

State amounts x1, x2, . . . , and xN at the respective final times of the sections are calculated by numerically integrating the equation of state with respect to the inputs u0, u1, . . . and uN under the initial condition x0. At this time, an input in each section is acquired by applying a linear interpolation on the input provided at the final time of each section. As a result thereof, the state amount is determined with respect to the input, and the evaluation function and the constraints are expressed according thereto. Therefore, the converted parameter optimization problem can be expressed in the following manner.

Assuming that X collectively represents the parameters that should be optimized, X is expressed as indicated by an equation 8.

$$X=[u_0^T \ldots u_X^T]^T \qquad \text{[Equation 8]}$$

Therefore, the evaluation function indicated by the equation 5 is expressed as indicated by an equation 9.

$$J=\Phi(X) \qquad \text{[Equation 9]}$$

Further, the constraints indicated by the equation 3 and the equation 4 are expressed as indicated by an equation 10 and an equation 11, respectively.

$$\psi(X)=[\psi_0^T\psi_1^T \ldots \psi_X^T]=0 \qquad \text{[Equation 10]}$$

$$\Theta(X)=[\theta_0^T\theta_1^T \ldots \theta_X^T]\le 0 \qquad \text{[Equation 11]}$$

In this manner, the optimal control problem expressed as described above can be converted into the parameter optimization problem expressed as the equation 8 to the equation 11.

The evaluation function J for formulating the problem for seeking the optimal control instruction according to the road surface as the optimal control problem is defined as indicated by an equation 12 so as to minimize the vertical acceleration Az to thus improve ride comfort and also reduce the control instruction value u. In the equation 12, q1 and q2 are weight coefficients. The weight coefficients q1 and q2 are preset based on, for example, a result of an experiment.

$$J=\int_0^{t_f}(q_1Az^2+q_2u^2)dt \qquad \text{[Equation 12]}$$

The direct optimal control portion 22 numerically analytically solves the parameter optimization problem formulated in this manner by the optimization method, thereby deriving the optimal instruction value on various road surfaces.

(2) Learn Instruction Value

A DNN 23, which is formed by artificial intelligence, is caused to learn inputs and outputs on various road surfaces while the optimal instruction value derived from the search for the direct optimal control instruction value is handled as the output and the road surface profile and the vehicle state amount at this time are handled as the input. The DNN 23 is a deep neural network for learning, and is configured similarly to an in-vehicle DNN (the first instruction calculation portion 14). The time-series data of the road surface input as the road surface profile and the time-series data of the vehicle state amount are input to the DNN 23. At this time, a weight coefficient between neurons in the DNN 23 is acquired while the time-series data of the optimal instruction value is handled as teacher data in correspondence with the road surface input and the vehicle state amount.

(3) Download Weight Coefficient

The weight coefficient of the DNN 23 trained by the learning of the instruction value is set to the DNN corresponding to the first instruction calculation portion 14 of the actual ECU 11. By this operation, the first instruction calculation portion 14 of the controller 12 is constructed.

(4) Calculate Optimal Instruction Value

The controller 12 including the first instruction calculation portion 14 is mounted on the vehicle. The sprung acceleration sensor 8, the vehicle height sensor 9, and the road surface measurement sensor 10 are connected to the input side of the controller 12. The damping force variable actuator 7 of the variable damper 6 is connected to the output side of the controller 12. The controller 12 acquires the road surface input and the vehicle state amount based on the detection signals of the sprung acceleration sensor 8, the vehicle height sensor 9, and the road surface measurement sensor 10. The controller 12 inputs the time-series data of the road surface input as the road surface profile and the time-series data of the vehicle state amount to the first instruction calculation portion 14. The first instruction calculation portion 14 outputs the first instruction value directed to the variable damper 6, which serves as the optimal instruction, according to the learning result when the pieces of time-series data of the road surface input and the vehicle state amount are input thereto.

In this manner, the direct optimal control portion 22 derives the direct optimal control instruction by the off-line optimization of the numerical value under various conditions. The artificial intelligence (the DNN 23) is caused to learn the road surface profile and the vehicle state amount, and the optimal instruction at this time. As a result, the direction optimal control can be realized by the controller 12 (the ECU 11) with the DNN (the first instruction calculation portion 14) mounted thereon without requiring optimization step by step.

Figure 4:
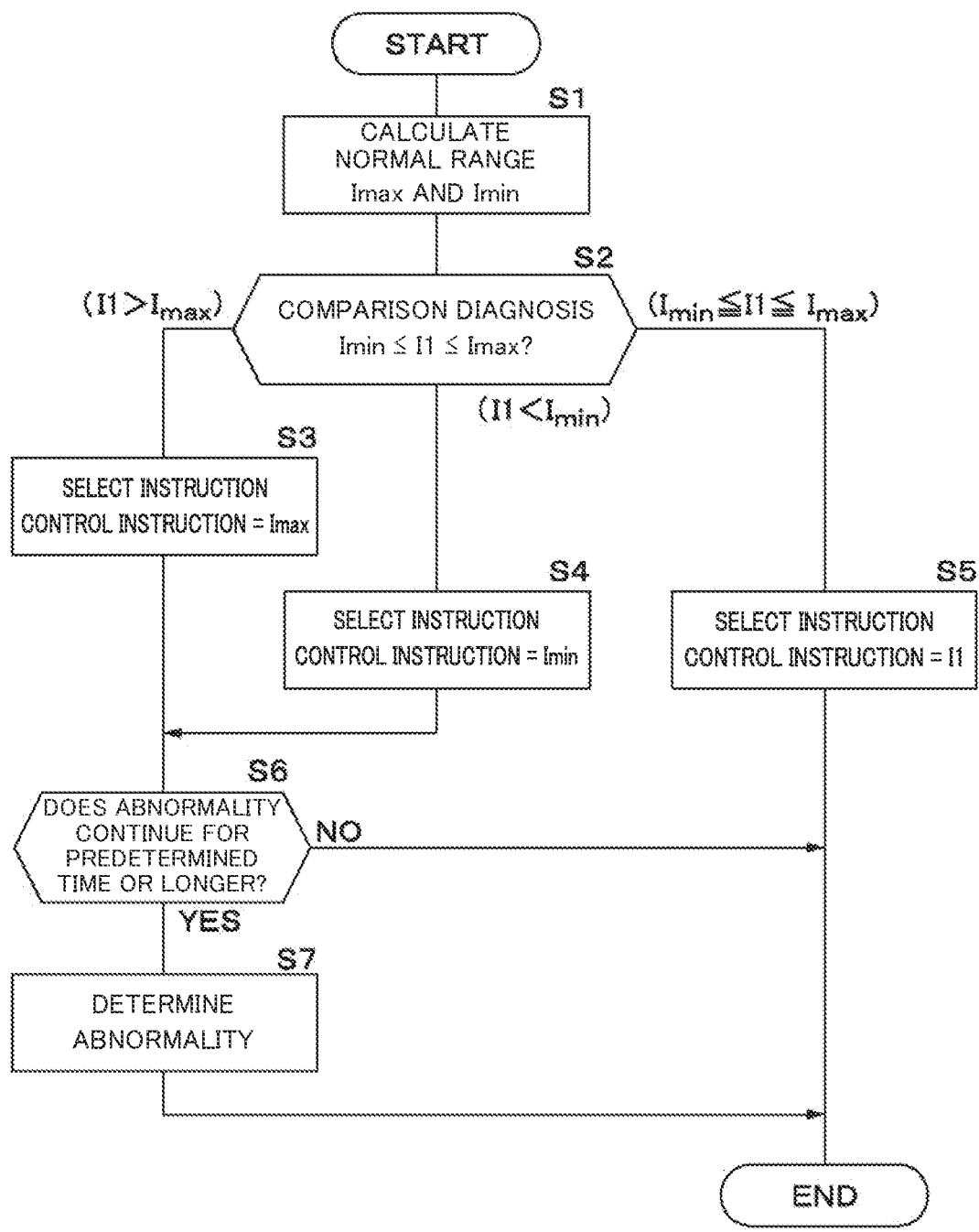
FIG. 4 is a flowchart illustrating control instruction limit processing performed by a control instruction output portion.

Next, the control instruction limit processing performed by the control instruction output portion 16 will be described with reference to FIG. 4.

In S1, the control instruction output portion 16 defines a predetermined range in which the first instruction value is determined to be normal. i.e., a normal range as a determination threshold value for determining whether the first instruction value is a value failing to comply with the intention of the control.

In S2, the control instruction output unit 16 determines whether the first instruction value is a value failing to comply with the intention of the control. Whether the first instruction value is a value failing to comply with the intention of the control can be determined based on whether the vehicle is continuously kept in a state that the difference between the first instruction value and the second instruction value according to the existing control law exceeds the normal range for a time (whether a time outside the normal range lasts).

The normal range is set based on a threshold value between which opposite results are yielded on the motion of the suspension apparatus 4 formed by a semi-active suspension. Examples of when opposite results are yielded on the motion of the suspension apparatus 4 include when the first instruction calculation portion 14 based on the AI outputs an instruction lower than a reference while the second instruction calculation portion 15 based on the existing control law attempts to set a higher damping rate than the reference. Examples of when opposite results are yielded on the motion of the suspension apparatus 4 further include when the first instruction calculation portion 14 based on the AI outputs an instruction higher than the reference while the second instruction calculation portion 15 based on the existing control law attempts to set a lower damping rate than the reference.

In commonly used control of a semi-active damper, the damping rate is set to a low rate, i.e., is set to be soft to improve the ride comfort under usual circumstances, and is set to a high rate, i.e., is set to be hard under such a scene that the motion of the vehicle body is desired to be suppressed. For example, it is considered to be abnormal that such a scene continues long that the AI (the first instruction calculation portion 14) outputs an instruction (the first instruction value) leading to relatively soft damping when the control law (the second instruction calculation portion 15) outputs an instruction (the second instruction value) leading to relatively hard damping. Then, a threshold value for determining relatively hard or soft damping is used as the reference. This reference varies depending on the vehicle speed and the state of the vehicle.

The intention of the control changes according to the vehicle state such as the vehicle speed. Therefore, the width of the normal range of the first instruction value from the second instruction value (within the range of the predetermined amount) may be changeable according to the vehicle state. In the commonly used control of a semi-active damper, the damping is kept in a soft state under usual circumstances. However, the damping is tuned to change the hardness in the usual state and the amount thereof when the control intervenes according to the vehicle speed. For this reason, the relatively hard or soft range changes. As a result, a reduction in the controlled range is also accompanied by a reduction in the normal range, thereby causing a change in the reference. As one example, the normal range of the first instruction value from the second instruction value is widened in a low-speed running state and is narrowed in a high-speed running state.

Further, whether the first instruction value is a value failing to comply with the intention of the control is also determined in terms of whether the first instruction value is an instruction that makes the vehicle state clearly unstable. Conceivable examples of the instruction that makes the vehicle state clearly unstable include (a) an instruction working so as to further promote roll when the vehicle body is in a roll state, (b) an instruction working so as to further promote pitch when the vehicle body is in a pitch state, and (c) an instruction working so as to further promote a vibration when the vehicle body is vertically vibrating.

In light thereof, if the roll amount further increases due to the control of the variable damper 6 based on the first instruction value when the vehicle is in a state that the roll amount is greater than a predetermined amount, the control instruction output portion 16 limits the first instruction value and outputs it as the control instruction. At this time, the predetermined amount of the roll amount is, for example, an amount that can be determined to be a roll level considered to affect the steering stability if the roll increases more than that when the vehicle is rolling.

If the pitch amount further increases due to the control of the variable damper 6 based on the first instruction value w % ben the vehicle is in a state that the pitch amount is greater than a predetermined amount, the control instruction output portion 16 limits the first instruction value and outputs it as the control instruction. If the vertical vibration amount further increases due to the control of the variable damper 6 based on the first instruction value when the vehicle is in a state that the vertical vibration amount is greater than a predetermined amount, the control instruction output portion 16 limits the first instruction value and outputs it as the control instruction. The predetermined amount of the pitch amount and the predetermined amount of the vertical vibration amount are also set in consideration of the influence on the steering stability similarly to the predetermined amount of the roll amount. In this case, the control instruction output portion 16 has respective individual normal ranges (predetermined amounts) with respect to the roll amount, the pitch amount, and the vertical vibration amount.

A control function working so as to suppress the unstable state of the vehicle is constructed using, for example, an ABS (anti-lock brake system) and a TCS (traction control system). Such a control function is switched to be enabled or disabled according to the vehicle state, and the level of the effect thereof is also controlled. Therefore, regarding the condition for determining whether the first instruction value is a value failing to comply with the intention of the control, the determination is also made with the enablement/disablement switched and the threshold value changed similarly.

In S2, the control instruction output portion 16 determines whether the first instruction value is a value between a lower limit value Imin and an upper limit value Imax of the normal range. If the first instruction value is a value within the normal range, the control instruction output portion 16 directly employs the first instruction value as the control instruction (S5). In other words, when the first instruction value is a value within the normal range, the processing proceeds to S5 and the control instruction is set to the present first instruction value.

On the other hand, if the first instruction value falls outside the normal range, the control instruction output portion 16 outputs a limited value within the normal range as the control instruction (S3 and S4). For example, if the first instruction value is lower than the lower limit value Imin, the processing proceeds to S4, in which the control instruction output portion 16 sets the control instruction to the lower limit value Imin. If the first instruction value is higher than the upper limit value Imax, the processing proceeds to S3, in which the control instruction output portion 16 sets the control instruction to the upper limit value Imax. As a result, the vehicle state can be avoided from becoming unstable due to the control instruction failing to comply with the intention of the control.

In S6, the control instruction output portion 16 determines whether the vehicle is continuously kept in the state that the first instruction value falls outside the normal range for a predetermined certain time or longer. At this time, the certain time is a time that makes it possible to determine that this state is not caused by an influence of noise, sensor precision, or the like and the first instruction calculation portion 14 is clearly abnormal, and is set as appropriate based on, for example, a result of an experiment. If the vehicle is continuously kept in the state that the first instruction value falls outside the normal range for a long time, "YES" is determined in S6, and the processing proceeds to S7. In other words, if the vehicle is continuously kept in the state that the deviation of the first instruction value from the second instruction value is greater than the predetermined amount for a time longer than the predetermined time, the control instruction output portion 16 determines that the present state is the abnormal state. In S7, the control instruction output portion 16 determines that there is an abnormality in the first instruction calculation portion 14 based on the AI, and notifies the vehicle system of the abnormal state. When determining that the present state is the abnormal state, the control instruction output portion 16 records the abnormal state and also outputs a signal for notifying the driver on the vehicle. As a result, the controller 12 can take a necessary measure such as conducting additional learning, communicating with a database that manages the AI (the first instruction calculation portion 14), or prompting maintenance at a dealer.

The controller 12 may continue the control while replacing the first instruction calculation portion 14 with the existing control law (for example, the second instruction calculation portion 15) as a fail-safe mode when determining abnormality. In other words, the control instruction output portion 16 may output the second instruction value as the control instruction in the case of the abnormal state. On the other hand, if the vehicle is kept in the state that the first instruction value falls outside the normal range for a time shorter than the predetermined time, "NO" is determined in S6 and the processing is ended.

In this manner, according to the present embodiment, the control instruction output portion 16 outputs the control instruction for controlling the variable damper 6 (the force generation mechanism) based on the first instruction value (the first target amount). If the first instruction value works in the direction leading to a vehicle state amount greater than the predetermined amount due to the control of the variable damper 6 based on the first instruction value, the control instruction output portion 16 limits the first instruction value and outputs it as the control instruction.

The control instruction output portion 16 defines the normal range that allows the vehicle to stably operate with respect to the control instruction (the first instruction value) calculated by the AI (DNN), and controls the variable damper 6 within the normal range (the upper limit or the lower limit). As a result, the controller 12 can ensure the stability of the vehicle behavior, and also check the correctness of the first instruction value calculated by the AI and confirm whether the learning state of the AI is normal.

The first instruction calculation portion 14 outputs the first instruction value corresponding to the first target amount using the learning result acquired from the machine learning in advance. The learning result is the neural network (DNN) already trained by the deep learning. At this time, the DNN of the first instruction calculation portion 14 learns the instruction value determined by the optimization method so as to minimize the evaluation function J in advance, and the vehicle state amount. This allows the controller 12 to perform control according to a truly optimal instruction according to the vehicle state amount.

If the deviation of the first instruction value from the second instruction value is greater than the predetermined amount, the control instruction output portion 16 outputs a value within the predetermined amount from the second instruction value as the control instruction. This allows the controller 12 to determine whether the first instruction value (the control amount) calculated by the first instruction calculation portion 14 promotes the unstable state of the vehicle by comparing it with another control law.

The second instruction calculation portion 15 has the control law not using machine learning, and outputs the second instruction value of the damping force, which corresponds to the second target amount, by inputting the vehicle state amount. More specifically, the second instruction calculation portion 15 uses the untrained existing control law (the skyhook control, the BLQ control, or the like). The second instruction calculation portion 15 uses a conventionally existing control law at this time, and therefore the second instruction value is highly reliable. The control instruction output portion 16 limits the first instruction value using such a highly reliable control law. As a result, the vehicle can be prevented from being brought into an abnormal state.

If the deviation of the first instruction value from the second instruction value is smaller than the predetermined amount, the control instruction output portion 16 outputs the first instruction value as the control instruction. If the first instruction value falls within the normal range as a result of the comparison between the first instruction value and the second instruction value, the control instruction output portion 16 directly outputs the first instruction value as the control instruction.

On the other hand, if the first instruction value falls outside the normal range, the control instruction output portion 16 limits the first instruction value into a limited value within the normal range and outputs it as the control instruction. In other words, if the deviation of the first instruction value from the second instruction value is greater than the predetermined amount, the control instruction output portion 16 limits the first instruction value and outputs it as the control instruction. Due to this operation, a limit can be imposed on the first instruction value when the first instruction value deviates from the second instruction value beyond the normal range. As a result, the vehicle state can be avoided from becoming unstable due to the instruction failing to comply with the intention of the control.

The intention of the control changes according to the vehicle state such as the vehicle speed. Therefore, the width of the normal range of the first instruction value from the second instruction value (within the range of the predetermined amount) is changed according to the vehicle state. As a result, the control instruction output portion 16 can output a control instruction further complying with the intention of the control.

If the roll amount further increases due to the control of the variable damper 6 based on the first instruction value when the vehicle is in the state that the roll amount is greater than the predetermined amount, the control instruction output portion 16 limits the first instruction value and outputs it as the control instruction. As a result, a limit can be imposed on the control instruction working so as to further promote the roll when the vehicle body is in the roll state.

If the pitch amount further increases due to the control of the variable damper 6 based on the first instruction value when the vehicle is in the state that the pitch amount is greater than the predetermined amount, the control instruction output portion 16 limits the first instruction value and outputs it as the control instruction. As a result, a limit can be imposed on the control instruction working so as to further promote the pitch when the vehicle body is in the pitch state.

If the vertical vibration amount further increases due to the control of the variable damper 6 based on the first instruction value when the vehicle is in the state that the vertical vibration amount is greater than the predetermined amount, the control instruction output portion 16 limits the first instruction value and outputs it as the control instruction. As a result, a limit can be imposed on the control instruction working so as to further promote the vibration when the vehicle body is in the vertically vibrating state.

If the vehicle is continuously kept in the state that the deviation of the first instruction value from the second instruction value is greater than the predetermined amount for a time longer than the predetermined time, the control instruction output portion 16 determines that the present state is the abnormal state. Due to this operation, when an instruction outside the normal range continues long, the control instruction output portion 16 can determine that there is an abnormality in the AI and notify the vehicle system of the abnormal state. As a result, for example, additional learning can be conducted.

When determining that the present state is the abnormal state, the control instruction output portion 16 records the abnormal state and also outputs the signal for notifying the driver on the vehicle. As a result, the controller 12 can take a necessary measure such as communicating with the database that manages the AI or prompting maintenance at the dealer.

The control instruction output portion 16 outputs the second instruction value as the control instruction in the case of the abnormal state. As a result, the controller 12 can continue the control while replacing the first instruction value with the existing control law as the fail-safe mode when determining abnormality.

Next, FIGS. 1 and 2 illustrate a second embodiment. The second embodiment is characterized in that a second instruction calculation portion has a second learning result acquired from machine learning in advance under a condition different from the first instruction calculation portion, and outputs a second target amount based on the second learning result and a plurality of different pieces of information. The second embodiment will be described, indicating components similar to the above-described first embodiment by the same reference numerals and omitting descriptions thereof.

A controller 30 according to the second embodiment is configured approximately similarly to the controller 12 according to the first embodiment. The controller 30 includes the state amount calculation portion 13, the first instruction calculation portion 14, a second instruction calculation portion 31, and a control instruction output portion 32.

The second instruction calculation portion 31 outputs the second instruction value of the damping force, which corresponds to the second target amount, using the second learning result acquired from the machine learning in advance by inputting the plurality of different pieces of information under the condition different from the first instruction calculation portion 14. The second learning result is a deep neural network (DNN) already trained by deep learning. In other words, the second instruction calculation portion 31 is formed by a deep neural network (DNN) trained by the machine learning in advance under the condition different from the first instruction calculation portion 14. The second instruction calculation portion 31 is an AI instruction calculation portion for diagnosis, and is formed by the AI (DNN) trained with learning data different from the first instruction calculation portion 14. In this case, the different learning data refers to, for example, data in which the method for calculating an instruction yielded as an output is different, data in which a road surface used as an input is different, or data in which both of them are different with respect to data serving as a learning source. The learning method of the second instruction calculation portion 31 is, for example, the same as the first instruction calculation portion 14.

The second instruction calculation portion 31 is formed by, for example, a multi-layered neural network including four or more layers. Each layer includes a plurality of neurons, and neurons of two layers adjacent to each other are connected via a weight coefficient. The weight coefficient is set by the learning conducted in advance. The DNN of the second instruction calculation portion 31 may have the number of layers and/or the number of neurons equal to the DNN of the first instruction calculation portion 14, or may have the number of layers and/or the number of neurons different from the DNN of the first instruction calculation portion 14.

The second target amount is, for example, a target damping force determined by the DNN. More specifically, the second instruction calculation portion 31 acquires the time-series data of the road surface input (the road surface profile) and the time-series data of the vehicle state amount based on the detection value of the vertical vibration acceleration detected by the sprung acceleration sensor 8, the detection value of the vehicle height detected by the vehicle height sensor 9, and the detection value of the road surface detected by the road surface measurement sensor 10. The second instruction calculation portion 31 outputs time-series data of an optimal instruction value based on the time-series data of the road surface input and the time-series data of the vehicle state amount. At this time, the latest optimal instruction value corresponds to the second instruction value of the damping force optimal at the present moment. Due to this operation, the second instruction calculation portion 31 outputs the second instruction value of the damping force most appropriate for the present vehicle and road surface. The second instruction value of the damping force corresponds to, for example, an electric current value for driving the damping force variable actuator 7.

The time-series data of the vehicle state amount is not limited to the time-series data of the vertical vibration acceleration and the vehicle height of the vehicle body 1, and may include the time-series data of the sprung speed, the relative speed (the piston speed), the longitudinal acceleration, the lateral acceleration, the roll amount, the pitch amount, and/or the like.

The control instruction output portion 32 is configured similarly to the control instruction output portion 16 according to the first embodiment. The control instruction output portion 32 is an instruction limit portion, and determines whether the first instruction value does not constitute an instruction failing to comply with the intention of the control, and imposes a limit on the first instruction value as necessary.

The control instruction output portion 32 outputs the control instruction for controlling the variable damper 6 (the force generation mechanism) based on the first instruction value (the first target amount). If the first instruction value works in the direction leading to a vehicle state amount greater than the predetermined amount due to the control of the variable damper 6 based on the first instruction value, the control instruction output portion 32 limits the first instruction value and outputs it as the control instruction.

Therefore, if the deviation of the first instruction value from the second instruction value is greater than a predetermined amount, the control instruction output portion 32 outputs a value within the predetermined amount from the second instruction value as the control instruction. If the deviation of the first instruction value from the second instruction value is greater than the predetermined amount, the control instruction output portion 32 limits the first instruction value and outputs it as the control instruction. If the deviation of the first instruction value from the second instruction value is smaller than the predetermined amount, the control instruction output portion 32 outputs the first instruction value as the control instruction. The control instruction output portion 32 performs the control instruction limit processing illustrated in FIG. 4 similarly to the control instruction output portion 16 according to the first embodiment. The predetermined amount corresponds to an allowable range for the difference between the first instruction value and the second instruction value, and is set as appropriate based on, for example, a result of an experiment.

In this manner, the second embodiment can also bring about advantageous effects approximately similar to the first embodiment. Further, in the second embodiment, the second instruction calculation portion 31 is also formed by the DNN trained by the deep learning similarly to the first instruction calculation portion 14. In this case, the second instruction calculation portion 31 is formed by the trained deep neural network (DNN) as the second learning result acquired from the machine learning in advance under the condition different from the first instruction calculation portion 14. As a result, by using the different trained AI as the comparison target, the controller 30 can ensure the stability of the vehicle behavior, and also check the correctness of the first instruction value calculated by the AI and confirm whether the learning state of the AI is normal.

If the deviation of the first instruction value from the second instruction value is greater than the predetermined amount, the control instruction output portion 32 limits the first instruction value and outputs it as the control instruction. A limit can be imposed on the first instruction value when the first instruction value deviates from the second instruction value beyond the normal range.

In the second embodiment, the controller 30 is assumed to include one second instruction calculation portion 31 serving as the AI instruction calculation portion for diagnosis. Without being limited thereto, the controller may include a plurality of AI instruction calculation portions for diagnosis.

In this case, assume that the read AI is AIs each trained with different pieces of learning data. In the case where the controller includes the plurality of AI instruction calculation portions for diagnosis, normal two AIs can be determined based on a majority vote. Therefore, the controller can continue the control using the normal AIs until an abnormality occurs again.

Figure 5:
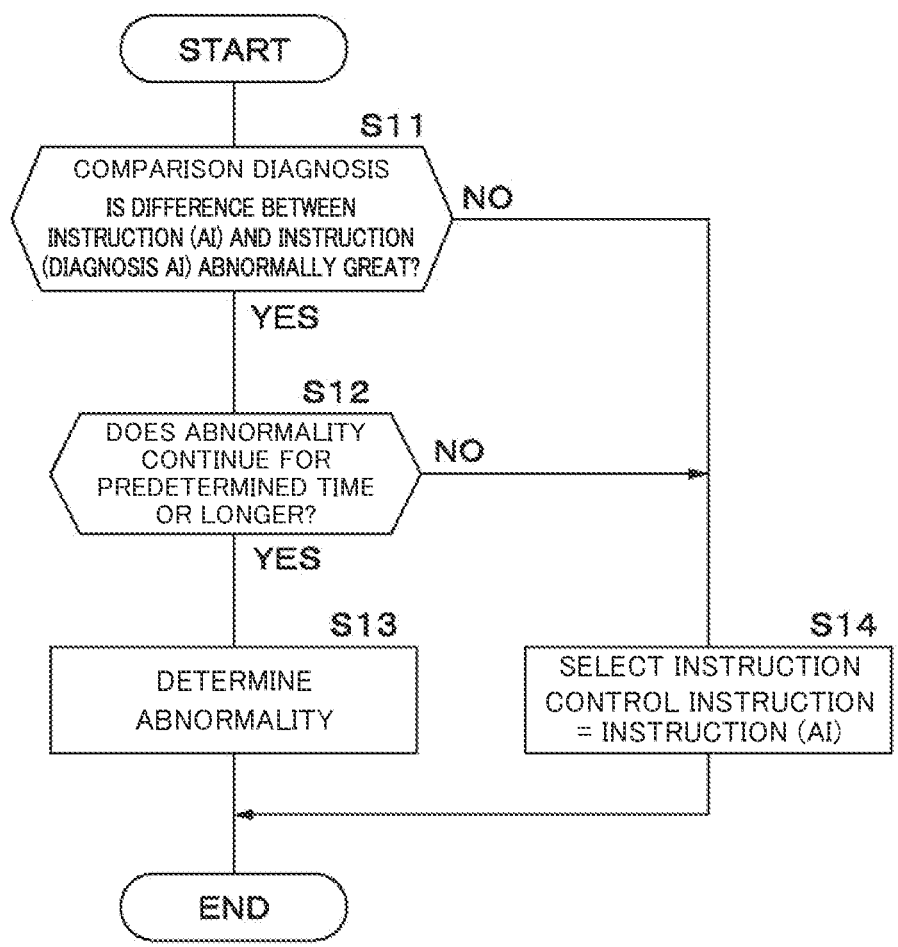
FIG. 5 is a flowchart illustrating control instruction abnormality determination processing performed by a control instruction output portion according to a modification.

In the case of such a modification, the control instruction output portion performs control instruction abnormality determination processing illustrated in FIG. 5 a plurality of times. The control instruction output portion selects arbitrary two AI instruction calculation portions from the plurality of AI instruction calculation portions including the plurality of AI instruction calculation portions for diagnosis (the second instruction calculation portion) in addition to the AI instruction calculation portion (the first instruction calculation portion). The control instruction output portion sets one of the selected two AI instruction calculation portions as the AI instruction calculation portion targeted for the determination, and the other of them as the AI instruction calculation portion for diagnosis.

In S11, the control instruction output portion compares the instruction of the AI instruction calculation portion targeted for the determination, and the instruction of the AI instruction calculation portion for diagnosis. In S11, the control instruction output portion determines whether the difference between these two instructions is great beyond the predetermined amount (the normal range). If the difference between the instructions falls within the normal range, the control instruction output portion determines "NO" in S11, and the processing proceeds to S14. In S14, the control instruction output portion employs the instruction of the AI instruction calculation portion targeted for the determination. Then, the processing is ended.

If the difference between the instructions is great beyond the normal range, the control instruction output portion estimates that the present state is an abnormal state and determines "NO" in S11. Then, the processing proceeds to S12. In S12, the control instruction output portion determines whether the abnormal state continues for a predetermined time or longer. If the abnormal state continues for a time shorter than the predetermined time, the control instruction output portion estimates that the abnormality is temporary and determines "NO" in S12. Then, the processing proceeds to S14. If the abnormal state continues for the predetermined time or longer, the control instruction output portion determines "YES" in S12. Then, the processing proceeds to S13. In S13, the control instruction output portion determines that the AI instruction calculation portion targeted for the determination is abnormal. Then, the processing is ended.

This abnormality determination processing is performed with respect to all the AI instruction calculation portions. As a result, w % ben an abnormality has occurred in the instruction of some AI instruction calculation portion, an abnormality is determined only in the comparison diagnosis including the abnormal AI while a normality is determined in the diagnosis between normal AIs. Therefore, the controller can continue the control of the suspension apparatus using the instruction of the AI instruction calculation portion determined to be normal.

The road surface profile may be stored or transmitted to an external server when the vehicle runs on an unlearned road surface. In this case, the direct optimal control portion acquires the optimal instruction value based on the newly acquired unlearned road surface profile. After that, the weight coefficient between the neurons in the DNN is learned again with the road surface profile and the optimal instruction value added thereto. After the learning is completed, the weight coefficient of a weight coefficient calculation map mounted on the vehicle is updated. According thereto, when the vehicle runs on the same road surface, the weight coefficient calculation map sets a new weight coefficient based on the updated data to the DNN. Therefore, the damping force of the variable damper 6 can be optimally controlled using the DNN.

Each of the above-described embodiments has been described, assuming that the vehicle state calculation portion 13 determines the vehicle state amount based on the detection value of the vertical vibration acceleration detected by the sprung acceleration sensor 8 and the detection value of the vehicle height detected by the vehicle height sensor 9. The present invention is not limited thereto, and the state amount calculation portion may acquire information regarding the vehicle state such as the vehicle speed based on a signal from a CAN (Controller Area Network) in addition to, for example, the detection value of the vertical vibration acceleration and the detection value of the vehicle height, and calculate or estimate the vehicle state amount in consideration of these pieces of information.

Each of the above-described embodiments has been described, assuming that the first instruction calculation portion 14 and the second instruction calculation portion 31 include the neural network. The present invention is not limited thereto, and the first instruction calculation portion may include no neural network as long as it can learn pairs of a plurality of target amounts with respect to a plurality of different vehicle state amounts as pairs of pieces of input and output data.

Each of the above-described embodiments has been described, assuming that the road surface profile is detected by the road surface measurement sensor 10. The present invention is not limited thereto, and information about the road surface profile may be acquired from, for example, a server based on GPS data or may be acquired from another vehicle via inter-vehicle communication. Alternatively, the road surface profile may be estimated based on the detection value of the vertical vibration acceleration detected by the sprung acceleration sensor 8 and the detection value of the vehicle height detected by the vehicle height sensor 9.

Each of the above-described embodiments has been described, assuming that the first instruction calculation portion 14 calculates the target amount (the target damping force) based on the vehicle state amount and the road surface information (the road surface profile). The present invention is not limited thereto, and the first instruction calculation portion may calculate the target amount only based on the vehicle state amount with the road surface information omitted. In this case, the first instruction calculation portion makes the above-described calculation using a learning result, which is acquired by causing the above-described first instruction calculation portion (the DNN) to learn pairs of a plurality of target amounts acquired using a predetermined evaluation method prepared in advance with respect to a plurality of different vehicle state amounts as pairs of pieces of input and output data.

Each of the above-described exemplary embodiments has been described, citing the example in which the first target amount and the second target amount are the first instruction value and the second instruction value based on the target damping force, but the first target amount and the second target amount may be a first instruction value and a second instruction value based on a target damping coefficient.

Each of the above-described embodiments has been described, citing the example in which the force generation mechanism is the variable damper 6 realized by a semi-active damper. The present invention is not limited thereto, and may be configured in such a manner that an active damper (any of an electric actuator and a hydraulic actuator) is used as the force generation mechanism. Each of the above-described embodiments has been described, citing the example in which the force generation mechanism that generates the adjustable force between the vehicle body 1 side and the wheel 2 side is embodied by the variable damper 6 realized by a damping force adjustable hydraulic shock absorber. The present invention is not limited thereto, and, for example, the force generation mechanism may be embodied by an air suspension, a stabilizer (a kinetic suspension), an electromagnetic suspension, or the like besides the hydraulic shock absorber.

Each of the above-described embodiments has been described, citing the vehicle behavior apparatus used together with the four-wheeled automobile by way of example. However, the present invention is not limited thereto, and can also be applied to, for example, a two-wheeled or three-wheeled automobile, or a truck, bus, or the like working as a service vehicle or a transporter vehicle.

Each of the above-described embodiments is only an example, and configurations indicated in different embodiments can be partially replaced or combined.

Next, examples of possible configurations as the suspension control apparatus and the method for controlling the suspension control apparatus included in the above-described embodiments will be described.

As a first configuration, a suspension control apparatus is configured to control a suspension apparatus including a force generation mechanism configured to adjust a force between a vehicle body and a wheel of a vehicle. The suspension control apparatus includes a first instruction calculation portion configured to output a first target amount using a learning result acquired from machine learning in advance by inputting a plurality of different pieces of information, and a control instruction output portion configured to output a control instruction for controlling the force generation mechanism based on the first target amount. The control instruction output portion is configured to limit the first target amount and output it as the control instruction in a case where the first target amount works in a direction leading to a greater vehicle state amount than a predetermined amount due to the control of the force generation mechanism based on the first target amount.

As a second configuration, in the first configuration, the learning result is a neural network already trained by deep learning.

As a third configuration, in the second configuration, the suspension control apparatus further includes a second instruction calculation portion different from the first instruction calculation portion. In a case where a deviation of the first target amount from a second target amount output from the second instruction calculation portion is greater than a predetermined amount, the control instruction output portion outputs a value within the predetermined amount relative to the second target amount as the control instruction.

As a fourth configuration, in the third configuration, the second instruction calculation portion has a control law not using machine learning, and outputs the second target amount by inputting the vehicle state amount.

As a fifth configuration, in the fourth configuration, a width of a predetermined range of the first target amount relative to the second target amount is changeable depending on a vehicle state.

As a sixth configuration, in the third configuration, the second instruction calculation portion has a second learning result acquired from machine learning in advance under a condition different from the first instruction calculation portion, and outputs the second target amount based on the second learning result and a plurality of different pieces of information.

As a seventh configuration, in the sixth configuration, in the case where the deviation of the first target amount from the second target amount is greater than the predetermined amount, the control instruction output portion limits the first target amount and outputs it as the control instruction.

As an eighth configuration, in the third configuration, in a case where the deviation of the first target amount from the second target amount output from the second instruction calculation portion is smaller than the predetermined amount, the control instruction output portion outputs the first target amount as the control instruction.

As a ninth configuration, in the third configuration, in a case where the vehicle is continuously kept in the state that the deviation of the first target amount from the second target amount output from the second instruction calculation portion is greater than the predetermined amount for a time longer than a predetermined time, the control instruction output portion determines that the present state is an abnormal state.

As a tenth configuration, in the ninth configuration, in the case where the present state is determined to be the abnormal state, the control instruction output portion records the abnormal state and also outputs a signal notifying a driver on the vehicle.

As an eleventh configuration, in the ninth configuration, in the case of the abnormal state, the control instruction output portion outputs the second target amount as the control instruction.

As a twelfth configuration, in the first configuration, the vehicle state amount is a roll amount of the vehicle body. In a case where the roll amount further increases due to the control of the force generation mechanism based on the first target amount when the vehicle is in a state that the roll amount is greater than a predetermined amount, the control instruction output portion limits the first target amount and outputs it as the control instruction.

As a thirteenth configuration, in the first configuration, the vehicle state amount is a pitch amount of the vehicle body. In a case where the pitch amount further increases due to the control of the force generation mechanism based on the first target amount when the vehicle is in a state that the pitch amount is greater than a predetermined amount, the control instruction output portion limits the first target amount and outputs it as the control instruction.

As a fourteenth configuration, in the first configuration, the vehicle state amount is a vertical vibration amount of the vehicle body. In a case where the vertical vibration amount further increases due to the control of the force generation mechanism based on the first target amount when the vehicle is in a state that the vertical vibration amount is greater than a predetermined amount, the control instruction output portion limits the first target amount and outputs it as the control instruction.

A fifteenth configuration is a method for controlling a suspension apparatus including a force generation mechanism configured to adjust a force between a vehicle body and a wheel of a vehicle. The method includes a first step of outputting a first target amount using a learning result acquired from machine learning in advance by inputting a plurality of different pieces of information, and a second step of limiting the first target amount and outputting it as a control instruction to the force generation mechanism in a case where the first target amount works in a direction leading to a greater vehicle state amount than a predetermined amount due to control of the force generation mechanism based on the first target amount.

As a sixteenth configuration, in the fifteenth configuration, the learning result is a neural network already trained by deep learning.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

The present application claims priority under the Paris Convention to Japanese Patent Application No. 2020-130306 filed on Jul. 31, 2020. The entire disclosure of Japanese Patent Application No. 2020-130306 filed on Jul. 31, 2020 including the specification, the claims, the drawings, and the abstract is incorporated herein by reference in its entirety.

REFERENCE SIGNS LIST 1 vehicle body
2 wheel
3 tire
4 suspension apparatus
5 suspension spring (spring)
6 variable damper (force generation mechanism)
7 damping force variable actuator
8 sprung acceleration sensor
9 vehicle height sensor
10 road surface measurement sensor
11 ECU
12,30 controller
13 state amount calculation portion
14 first instruction calculation portion
15, 31 second instruction calculation portion
16, 32 control instruction output portion

The invention claimed is:

1. A suspension control apparatus configured to control a suspension apparatus including a force generator configured to adjust a force between a vehicle body and a wheel of a vehicle, the suspension control apparatus comprising:
a first instruction calculation portion configured to output a first target amount using a learning result acquired from machine learning in advance by inputting a plurality of different pieces of information; and
a control instruction output portion configured to output a control instruction to the force generator based on the first target amount, the control instruction output portion being configured to limit the first target amount and output it as the control instruction in a case where the first target amount works in a direction leading to a vehicle state amount greater than a predetermined amount due to the control of the force generator based on the first target amount, the suspension control apparatus further comprising a second instruction calculation portion different from the first instruction calculation portion, wherein, in a case where a deviation of the first target amount from a second target amount output from the second instruction calculation portion is greater than a predetermined deviation, the control instruction output portion outputs a value within the predetermined deviation relative to the second target amount as the control instruction.

2. The suspension control apparatus according to claim 1, wherein the learning result is a neural network already trained by deep learning.

3. The suspension control apparatus according to claim 1, wherein the second instruction calculation portion has a control law not using machine learning, and outputs the second target amount by inputting the vehicle state amount.

4. The suspension control apparatus according to claim 3, wherein a width of the predetermined deviation of the first target amount relative to the second target amount is changeable depending on a vehicle state.

5. The suspension control apparatus according to claim 1, wherein the second instruction calculation portion has a second learning result acquired from machine learning in advance under a condition different from the first instruction calculation portion, and outputs the second target amount based on the second learning result and a plurality of different pieces of information.

6. The suspension control apparatus according to claim 5, wherein, in the case where the deviation of the first target amount from the second target amount is greater than the predetermined deviation, the control instruction output portion limits the first target amount and outputs it as the control instruction.

7. The suspension control apparatus according to claim 1, wherein, in a case where the deviation of the first target amount from the second target amount output from the second instruction calculation portion is smaller than the predetermined deviation, the control instruction output portion outputs the first target amount as the control instruction.

8. The suspension control apparatus according to claim 1, wherein, in a case where the vehicle is continuously kept in the state that the deviation of the first target amount from the second target amount output from the second instruction calculation portion is greater than the predetermined deviation for a time longer than a predetermined time, the control instruction output portion determines that the present state is an abnormal state.

9. The suspension control apparatus according to claim 8, wherein, in the case where the present state is determined to be the abnormal state, the control instruction output portion records the abnormal state and also outputs a signal notifying a driver on the vehicle.

10. The suspension control apparatus according to claim 8, wherein, in the case of the abnormal state, the control instruction output portion outputs the second target amount as the control instruction.

11. A suspension control apparatus configured to control a suspension apparatus including a force generator configured to adjust a force between a vehicle body and a wheel of a vehicle, the suspension control apparatus comprising:
a first instruction calculation portion configured to output a first target amount using a learning result acquired from machine learning in advance by inputting a plurality of different pieces of information; and
a control instruction output portion configured to output a control instruction to the force generator based on the first target amount, the control instruction output portion being configured to limit the first target amount and output it as the control instruction in a case where the first target amount works in a direction leading to a vehicle state amount greater than a predetermined amount due to the control of the force generator based on the first target amount, wherein the vehicle state amount is a roll amount of the vehicle body, and
wherein, in a case where the roll amount further increases due to the control of the force generator based on the first target amount when the vehicle is in a state that the roll amount is greater than a predetermined amount, the control instruction output portion limits the first target amount and outputs it as the control instruction.

12. A suspension control apparatus configured to control a suspension apparatus including a force generator configured to adjust a force between a vehicle body and a wheel of a vehicle, the suspension control apparatus comprising:
a first instruction calculation portion configured to output a first target amount using a learning result acquired from machine learning in advance by inputting a plurality of different pieces of information; and
a control instruction output portion configured to output a control instruction to the force generator based on the first target amount, the control instruction output portion being configured to limit the first target amount and output it as the control instruction in a case where the first target amount works in a direction leading to a vehicle state amount greater than a predetermined amount due to the control of the force generator based on the first target amount, wherein the vehicle state amount is a pitch amount of the vehicle body, and
wherein, in a case where the pitch amount further increases due to the control of the force generator based on the first target amount when the vehicle is in a state that the pitch amount is greater than a predetermined amount, the control instruction output portion limits the first target amount and outputs it as the control instruction.

13. A suspension control apparatus configured to control a suspension apparatus including a force generator configured to adjust a force between a vehicle body and a wheel of a vehicle, the suspension control apparatus comprising:
a first instruction calculation portion configured to output a first target amount using a learning result acquired from machine learning in advance by inputting a plurality of different pieces of information; and
a control instruction output portion configured to output a control instruction to the force generator based on the first target amount, the control instruction output portion being configured to limit the first target amount and output it as the control instruction in a case where the first target amount works in a direction leading to a vehicle state amount greater than a predetermined amount due to the control of the force generator based on the first target amount, wherein the vehicle state amount is a vertical vibration amount of the vehicle body, and
wherein, in a case where the vertical vibration amount further increases due to the control of the force generator based on the first target amount when the vehicle is in a state that the vertical vibration amount is greater than a predetermined amount, the control instruction output portion limits the first target amount and outputs it as the control instruction.

14. A method for controlling, with a suspension control apparatus, a suspension apparatus including a force generator configured to adjust a force between a vehicle body and a wheel of a vehicle, the suspension control apparatus including a first instruction calculation portion configured to output a first target amount and a second instruction calculation portion different from the first instruction calculation portion, the second instruction calculation portion configured to output a second target amount, the method comprising:
  a first step of outputting the first target amount output from the first instruction calculation portion using a learning result acquired from machine learning in advance by inputting a plurality of different pieces of information; and a second step of limiting the first target amount and outputting it as a control instruction to the force generator in a case where the first target amount works in a direction leading to a greater vehicle state amount than a predetermined amount due to output of the control instruction to the force generator on the first target amount, and a third step of outputting a value within a predetermined deviation relative to the second target amount as the control instruction, in a case where a deviation of the first target amount from the second target amount output from the second instruction calculation portion is greater than the predetermined deviation.

15. The method for controlling the suspension apparatus according to claim 14, wherein the learning result is a neural network already trained by deep learning.

* * * * *